(12) United States Patent
Harada (10) Patent No.: US 10,738,881 B2
(45) Date of Patent: Aug. 11, 2020

(54) HYDRAULIC CONTROL DEVICE (71) Applicant: HONDA MOTOR CO., LTD., Minato-ku, Tokyo (JP)

(72) Inventor: Masamichi Harada, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 200 days.

(21) Appl. No.: 16/055,186

(22) Filed: Aug. 6, 2018

(65) Prior Publication Data
US 2019/0048997 A1 Feb. 14, 2019

(30) Foreign Application Priority Data

Aug. 10, 2017 (JP) ................. 2017-155234

(51) Int. Cl.
| F16H 61/00 | (2006.01) |
| F16H 61/662 | (2006.01) |
| F16H 61/664 | (2006.01) |
| F16H 61/02 | (2006.01) |
| H02P 29/68 | (2016.01) |
| H02P 29/60 | (2016.01) |
| F16H 61/14 | (2006.01) |
| F16H 57/04 | (2010.01) |

(52) U.S. Cl.
CPC ..... *F16H 61/0025* (2013.01); *F16H 61/0009* (2013.01); *F16H 61/0031* (2013.01); *F16H 61/0213* (2013.01); *F16H 61/6646* (2013.01); *F16H 61/66259* (2013.01); *H02P 29/60* (2016.02); *H02P 29/68* (2016.02); *F16H 57/0436* (2013.01); *F16H 61/143* (2013.01); *F16H 2061/0209* (2013.01)

(58) Field of Classification Search
None
See application file for complete search history.

(56) References Cited

U.S. PATENT DOCUMENTS

| 6,253,137 B1* | 6/2001 | Abo ............... B60K 6/48 180/367 |
| 2016/0025207 A1* | 1/2016 | Miyamoto ...... F16H 61/0028 701/68 |
| 2017/0203670 A1* | 7/2017 | Morinaga ............ H02K 9/19 |

FOREIGN PATENT DOCUMENTS

| JP | 2010-183787 | 8/2010 |
| JP | 2015-200369 | 11/2015 |
| JP | 2017-028886 | 2/2017 |

OTHER PUBLICATIONS

Japanese Office Action for Japanese Patent Application No. 2017-155234 dated Apr. 9, 2019.

* cited by examiner

Primary Examiner — Justin Holmes
(74) Attorney, Agent, or Firm — Amin, Turocy & Watson, LLP (57) ABSTRACT In a control unit of a hydraulic control device, a temperature acquisition unit acquires a temperature of a driver and a temperature determination unit determines whether the temperature or a temperature at an approximate line of the temperature has reached a restriction start temperature. If the temperature determination unit determines that the temperature or the temperature has reached the restriction start temperature, a motor controller restricts a motor output.

5 Claims, 9 Drawing Sheets

HYDRAULIC CONTROL DEVICE

CROSS-REFERENCE TO RELATED APPLICATION

This application is based upon and claims the benefit of priority from Japanese Patent Application No. 2017-155234 filed on Aug. 10, 2017, the contents of which are incorporated herein by reference.

BACKGROUND OF THE INVENTION

Field of the Invention

The present invention relates to a hydraulic control device that supplies oil from a pump driven by a motor to a hydraulic operation unit of a transmission.

Description of the Related Art

For example, Japanese Laid-Open Patent Publication No. 2015-200369 discloses a hydraulic control device in a transmission of a vehicle that has a second pump (electric pump) connected between a first pump (mechanical pump) driven by a rotation of an engine and a hydraulic operation unit of the transmission. The second pump is driven by a rotation of a motor. In this case, the second pump pressurizes oil supplied from the first pump, and supplies the oil that has been pressurized to the hydraulic operation unit.

SUMMARY OF THE INVENTION

Incidentally, the second pump is rotated by the motor in a manner that the motor is driven by a motor driving unit including electronic components (such as a microcomputer and capacitor). In this case, the thermic lifetime of the motor driving unit including the electronic components depends on, for example, the temperature of oil, the ambient environment of the second pump and the motor including the motor driving unit, and the self heat generation of the electronic components when the motor is driven.

Therefore, in order to extend the thermic lifetime of the motor driving unit, it is desirable to use the motor driving unit in a proper temperature range. Specifically, a threshold temperature (predetermined temperature set to be less than use limit temperature of electronic components) depending on the target lifetime (prescribed lifetime) is set in advance, and the output of the motor is controlled (restricted) so that the temperature of the motor driving unit does not exceed the threshold temperature.

When the threshold temperature is set with a margin between the use limit temperature and the threshold temperature and the motor is used under a circumstance with a heavy heat load, the temperature of the motor driving unit reaches the threshold temperature very often and the actual lifetime of the motor driving unit becomes shorter. On the other hand, in a case where the motor is used under a circumstance with a light heat load, the original capability of the motor cannot be achieved sufficiently.

In addition, since the electronic components used in the motor driving unit deteriorate when exposed to heat, it is necessary to control the motor as appropriate while accurately knowing the heat load of the motor driving unit in order to extend the thermic lifetime of the motor driving unit.

The present invention is an improvement of the hydraulic control device according to Japanese Laid-Open Patent Publication No. 2015-200369, and an object is to provide a hydraulic control device that enables the appropriate use of the motor driving unit until the target lifetime in various usages and environment conditions.

A hydraulic control device according to the present invention is configured to supply oil to a hydraulic operation unit of a transmission from a pump driven by a motor, and includes a motor driving unit, a temperature acquisition unit, a thermal deterioration degree calculation unit, a restriction start temperature setting unit, a temperature determination unit, and a motor controller.

The motor driving unit is configured to drive the pump by driving the motor. The temperature acquisition unit is configured to acquire a temperature of the motor driving unit. The thermal deterioration degree calculation unit is configured to calculate a thermal deterioration degree of the motor driving unit on a basis of the temperature. The restriction start temperature setting unit is configured to set a restriction start temperature for restricting an output of the motor on a basis of the thermal deterioration degree. The temperature determination unit is configured to determine whether the temperature has reached the restriction start temperature. The motor controller is configured to restrict the output of the motor through the motor driving unit if the temperature determination unit determines that the temperature has reached the restriction start temperature.

In this manner, the restriction start temperature is set in accordance with the thermal deterioration degree, and in a temperature range of less than or equal to the restriction start temperature that is set, the output of the motor is controlled (restricted). Thus, the motor driving unit can be used properly until the target lifetime in various usages and environment conditions. As a result, for example, in a short-term use state, by the above determination method, the variation in actual lifetime due to the difference in usages and environment condition can be suppressed, and the probability that the motor driving unit reaches the thermic lifetime before the target lifetime (the failure probability of the motor driving unit) can be reduced.

Here, the temperature acquisition unit may be configured to sequentially acquire the temperature and create an approximate line of the temperature until a current time point by using the temperature that is sequentially acquired. In this case, the temperature determination unit is configured to determine whether the temperature at the current time point acquired by the temperature acquisition unit or an approximate value of the temperature at the current time point at the approximate line has reached the restriction start temperature. Then, if the temperature determination unit determines that the temperature or the approximate value has reached the restriction start temperature, the motor controller is configured to restrict the output of the motor.

Accordingly, if one of the temperature and the approximate value has reached the restriction start temperature, the output restriction of the motor is started quickly; thus, the probability that the motor driving unit fails before the target lifetime can be reduced efficiently.

In this case, the motor controller may be configured to set an average value of the output of the motor within a predetermined time where the temperature is sequentially acquired for creating the approximate line, as a maximum output value of the motor after an output restriction of the motor. Thus, after the output restriction of the motor, the temperature can be reduced from the restriction start temperature.

In addition, if a request output to the motor is more than or equal to the maximum output value after the output restriction of the motor, the motor controller may be configured to stop the output of the motor.

Thus, the fuel efficiency of the vehicle including the transmission during the output restriction of the motor can be maintained, and the reduction of the temperature from the restriction start temperature and the use of the motor driving unit until the target lifetime can be achieved.

In addition, the temperature determination unit may be configured to determine whether the temperature and the approximate value decrease to be less than or equal to a restriction cancel temperature that is set to be less than or equal to the restriction start temperature after an output restriction of the motor. Then, if the temperature determination unit determines that the temperature and the approximate value have decreased to be less than or equal to the restriction cancel temperature, the motor controller is configured to cancel the output restriction of the motor. Thus, the motor can be returned quickly from the output restricted state to the regular operation state.

Furthermore, the thermal deterioration degree calculation unit may be configured to calculate the thermal deterioration degree on the basis of the temperature that is sequentially acquired in the temperature acquisition unit. In this case, if the calculated thermal deterioration degree is more than an ideal change over time of the thermal deterioration degree relative to a use time of the motor driving unit or a travel distance of the vehicle including the transmission, the restriction start temperature setting unit is configured to decrease the restriction start temperature that is currently set, and if the calculated thermal deterioration degree is less than the ideal change over time, the restriction start temperature setting unit is configured to increase the restriction start temperature that is currently set.

Thus, if the thermal deterioration degree has progressed in the long-term use state, the restriction start temperature is decreased so that the motor output can be restricted easily. On the other hand, if the thermal deterioration degree has not progressed, the restriction start temperature is increased so that the motor can continue its regular operation state. As a result, the motor driving unit can be used until the target lifetime while the exposure of the motor driving unit to high temperature is prevented.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of a hydraulic control device according to the present invention will hereinafter be described in detail with reference to the attached drawings.

[1. Structure of the Present Embodiment]

Figure 1:
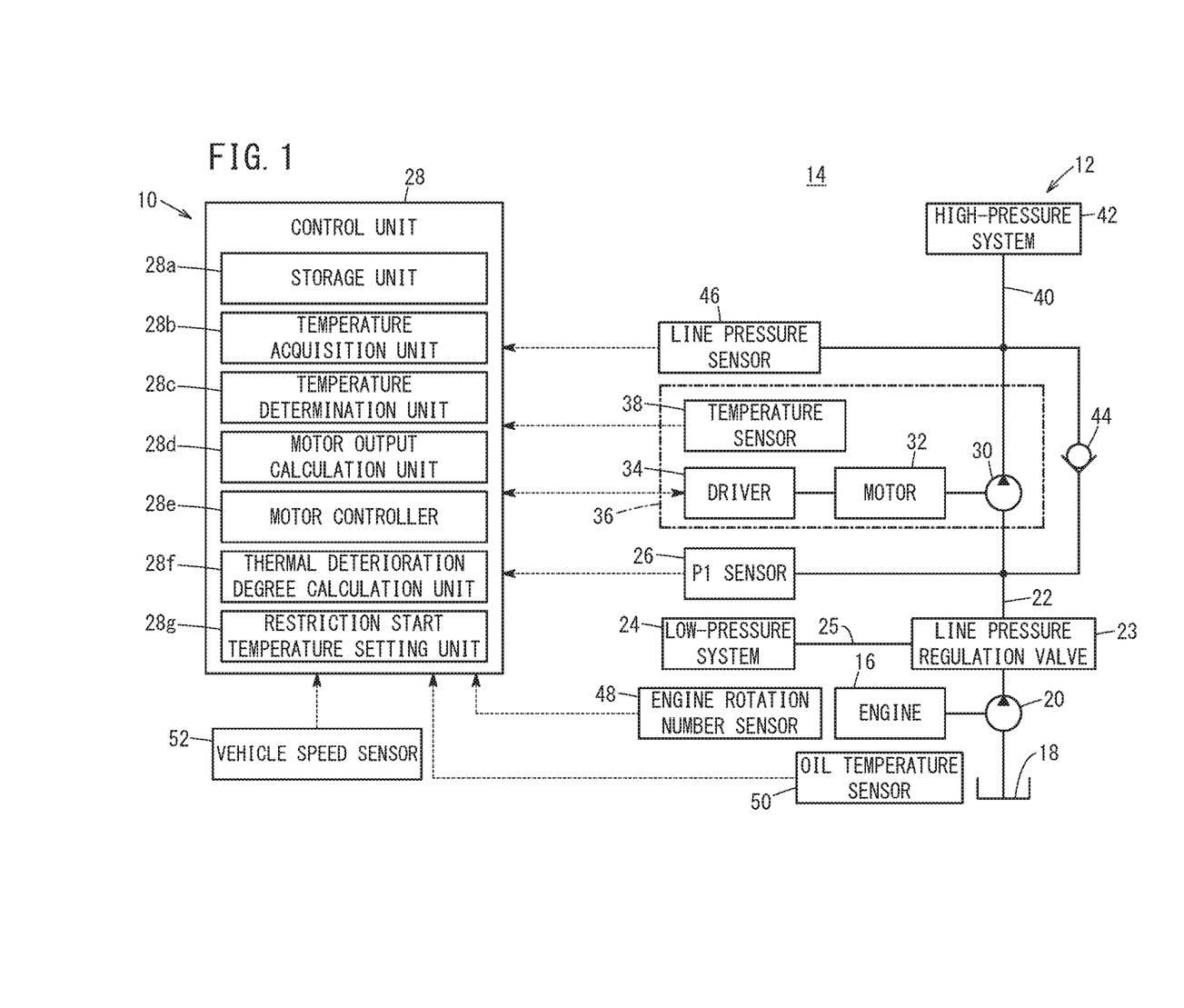
FIG. 1 is a structure diagram of a hydraulic control device according to the present embodiment.

FIG. 1 is a structure diagram of a hydraulic control device 10 according to the present embodiment. The hydraulic control device 10 is used in, for example, a vehicle 14 including a transmission 12 corresponding to a continuously variable transmission (CVT).

The hydraulic control device 10 includes a first pump 20 that is driven by an engine 16 of the vehicle 14 and pumps up oil (hydraulic oil) stored in a reservoir 18 and transfers the oil with pressure. An output side of the first pump 20 is connected to an oil passage 22. The oil that is transferred with pressure from the first pump 20 flows as first oil in the oil passage 22. In the middle of the oil passage 22, a line pressure regulation valve 23 corresponding to a spool valve is provided.

To the oil passage 22, a low-pressure system 24 of the transmission 12 is connected through the line pressure regulation valve 23 provided downstream of the first pump 20. The low-pressure system 24 is a hydraulic operation unit with a low pressure such as a torque converter to which the first oil is supplied. The line pressure regulation valve 23 supplies oil with a pressure value P3 (third oil) to the low-pressure system 24 through an oil passage 25 branched from the oil passage 22. The pressure value P3 is approximately the same as or less than a pressure P1 of the first oil (the output pressure of the first pump 20) flowing in the oil passage 22.

In the oil passage 22, an output pressure sensor (P1 sensor) 26 is disposed downstream of the line pressure regulation valve 23. The output pressure sensor 26 sequentially detects the output pressure P1, and sequentially outputs a detection signal expressing the detected output pressure P1 to a control unit 28 to be described below. On the downstream side in the oil passage 22, a second pump 30 is connected The second pump 30 is an electric pump that is driven by a rotation of a motor 32 included in the vehicle 14, and that outputs second oil, or the first oil that is supplied through the oil passage 22. In this case, the second pump 30 can pressurize the first oil that is supplied, and transfer the first oil that has been pressurized as the second oil. The motor 32 rotates under a control of a driver (motor driving unit) 34. The driver 34 controls the driving of the motor 32 on the basis of a control signal supplied from the control unit 28, and moreover, sequentially outputs a signal expressing a driving state of the motor 32 (for example, a rotation number Nem of the motor 32 based on a rotation number Nep of the second pump 30) to the control unit 28.

The second pump 30, the motor 32, and the driver 34 form an electric pump unit 36. The electric pump unit 36 includes a temperature sensor 38. The temperature sensor 38 sequentially detects a temperature Td of the driver 34 (electronic components thereof), that is, an internal temperature of the electric pump unit 36 and sequentially outputs the detection signal expressing the detected temperature Td to the control unit 28. The electronic components of the driver 34 include, for example, a microcomputer and a capacitor. It is only necessary that the temperature sensor 38 can detect the temperature Td of the driver 34; therefore, the temperature sensor 38 may be incorporated in the electric pump unit 36 or externally attached to the electric pump unit 36. The temperature sensor 38 is not an essential component, as will be described later.

An output side of the second pump 30 is connected to an oil passage 40. The oil passage 40 is connected to a high-pressure system 42 of the transmission 12. The high-pressure system 42 is, for example, a continuously variable transmission mechanism (hydraulic operation unit with high pressure) including a driven pulley and a driving pulley that are not shown. Between the two oil passages 22, 40, a check valve 44 and the second pump 30 are connected in parallel. The check valve 44 is a non-return valve provided to bypass the second pump 30, and allows the oil (first oil) to flow from the oil passage 22 disposed upstream to the oil passage 40 disposed downstream, and prevents the oil (second oil) from flowing from the oil passage 40 disposed downstream to the oil passage 22 disposed upstream.

A line pressure sensor 46 is disposed in the oil passage 40. The line pressure sensor 46 sequentially detects a pressure (line pressure) PH of the oil supplied to the high-pressure system 42 through the oil passage 40, and sequentially outputs the detection signal expressing the detected line pressure PH to the control unit 28.

The hydraulic control device 10 further includes an engine rotation number sensor 48, an oil temperature sensor 50, a vehicle speed sensor 52, and the control unit 28. The engine rotation number sensor 48 sequentially detects the engine rotation number New of the engine 16 (based on the rotation number Nmp of the first pump 20), and sequentially outputs the detection signal expressing the detected engine rotation number New (rotation number Nmp) to the control unit 28. The oil temperature sensor 50 sequentially detects a temperature (oil temperature) To of the first oil or the second oil, and sequentially outputs the detection signal expressing the detected oil temperature To to the control unit 28. Note that in FIG. 1, the temperature of the oil (first oil) stored in the reservoir 18 is detected as the oil temperature To, for example. The vehicle speed sensor 52 sequentially detects a vehicle speed V of the vehicle 14, and sequentially outputs the detection signal expressing the detected vehicle speed V to the control unit 28.

The control unit 28 is a microcomputer such as a CPU functioning as a transmission control unit (TCU) that controls the transmission 12 or an engine control unit (ECU) that controls the engine 16. The control unit 28 achieves functions of a temperature acquisition unit 28b, a temperature determination unit 28c, a motor output calculation unit 28d, a motor controller 28e, a thermal deterioration degree calculation unit 28f, and a restriction start temperature setting unit 28g by reading and executing programs stored in a storage unit 28a.

In the storage unit 28a, detection results based on the detection signals input from the above sensors to the control unit 28 are sequentially stored. In addition, processing results of each part of the control unit 28 are sequentially stored in the storage unit 28a.

The temperature acquisition unit 28b acquires the temperature Td of the driver 34 (electronic components thereof) from the temperature sensor 38. Alternatively, the temperature acquisition unit 28b estimates a temperature Tde of the driver 34 by using the oil temperature To from the oil temperature sensor 50, and acquires the estimated temperature Tde as the temperature Td. Therefore, if the hydraulic control device 10 includes either one of the temperature sensor 38 and the oil temperature sensor 50, the temperature Td of the driver 34 can be acquired; thus, the other sensor may be omitted.

The temperature determination unit 28c determines whether the temperature Td at the time when the temperature Td is acquired by the temperature acquisition unit 28b has reached a restriction start temperature Tc that is set in advance by the restriction start temperature setting unit 28g. The temperature determination unit 28c reads out the data of the temperature Td that are sequentially acquired by the temperature acquisition unit 28b within a last predetermined time (for example, several minutes) from the data of the temperature Td stored in the storage unit 28a. Then, the temperature determination unit 28c obtains an approximate line from the read data of the temperature Td, and determines whether a temperature (approximate value) Ta of the obtained approximate line has reached the restriction start temperature Tc. That is to say, the control unit 28 continues to monitor and record a latest temperature value and the temperature determination unit 28c creates the approximate line on the basis of the temperature values.

The motor output calculation unit 28d calculates a flow rate (necessary flow rate) Q of the second oil that is needed for the supply from the second pump 30 to the high-pressure system 42 in consideration of the line pressure PH or the amount of leakage of the oil in the oil passage 40 from the second pump 30 to the high-pressure system 42, for example. On the basis of the calculated necessary flow rate Q, the motor output calculation unit 28d estimates the rotation number Nem of the motor 32 that is necessary to discharge the oil at the necessary flow rate Q from the second pump 30. Furthermore, the motor output calculation unit 28d calculates a command value PWc of a motor output PW by multiplying the estimated rotation number Nem by the torque of the motor 32.

The motor output calculation unit 28d reads out the data of the command values PWc within the last predetermined time from the data of the command values PWc stored in the storage unit 28a, and calculates an average value PWave of the command values PWc within the predetermined time from the data of the read command values PWc. That is to say, the control unit 28 continues to monitor and record the latest motor output PW (command values PWc thereof), and the motor output calculation unit 28d calculates the average value PWave on the basis of these values.

Note that the control unit 28 sequentially acquires the rotation number Nem of the motor 32 from the driver 34. Therefore, the motor output calculation unit 28d may calculate the motor output PW by multiplying the acquired rotation number Nem by the torque of the motor 32, and set the calculated motor output PW as the command values PWc, and moreover calculate the average value PWave by using the motor output PW that is continuously monitored and recorded.

In addition, the motor output calculation unit 28d reads out the output pressure P1 and the line pressure PH stored in the storage unit 28a, and calculates a differential pressure $\Delta P$ ($\Delta P = PH - P3$) between the line pressure PH that is read out and the pressure value P3 of the oil supplied to the low-pressure system 24. Note that the differential pressure $\Delta P$ is the oil pressure that is necessary for the second pump 30 to pressurize the first oil from the pressure value P3 to the line pressure PH and supply the pressurized oil as the second oil from the oil passage 40 to the high-pressure system 42. In addition, for example, the motor output calculation unit 28d estimates the pressure value P3 from the transmission capacity requested by a lock-up clutch (not shown) in the vehicle 14 with reference to a map (not shown) stored in the storage unit 28a.

Furthermore, the motor output calculation unit 28d determines an operation point of the second pump 30 on the basis of the differential pressure ΔP and the necessary flow rate Q.

The motor controller 28e determines whether to control the motor 32 by using the command value PWc on the basis of the comparison between the average value PWave and the command value PWc based on the operation point, and outputs the control signal based on the determination result to the driver 34. For example, when either one of the temperature Ta and the temperature Td has reached the restriction start temperature Tc first and the command value PWc is more than or equal to the average value PWave, the motor controller 28e generates the control signal to instruct PWc=0 (stop of the motor 32) and supplies the control signal to the driver 34. Note that the restriction start temperature Tc is a threshold temperature to restrict the motor output PW (command value PWc thereof), and is also a predetermined temperature set less than a use limit temperature Tlim of each electronic component of the driver 34.

The thermal deterioration degree calculation unit 28f reads out the data of the temperature Td stored in the storage unit 28a, and calculates a thermal deterioration degree of the driver 34 (electronic components thereof) on the basis of the read data of the temperature Td. The restriction start temperature setting unit 28g sets the restriction start temperature Tc on the basis of the thermal deterioration degree calculated by the thermal deterioration degree calculation unit 28f.

[2. Operation of the Present Embodiment]

An operation of the hydraulic control device 10 according to the present embodiment with the above structure will be described with reference to FIG. 2 to FIG. 9B. Here, description is given concerning a short-term hydraulic control process illustrated in FIG. 2 and FIG. 3, a long-term hydraulic control process illustrated in FIG. 4 to FIG. 8, and other control processes (see FIG. 9A and FIG. 9B) by those hydraulic controls. The description is also given with reference to FIG. 1 as necessary.

<2.1 Short-Term Hydraulic Control Process>

The short-term hydraulic control process is a control process in the hydraulic control device 10 that is carried out for about several minutes or several tens of minutes, for example.

Here, an operation of the hydraulic system from the reservoir 18 to the high-pressure system 42 is described schematically first, and then the short-term hydraulic control process is described.

(2.1.1 Schematic Description of Operation of Hydraulic System)

First, when the driving of the first pump 20 is started by the driving of the engine 16, the first pump 20 pumps up the oil from the reservoir 18 and starts to transfer the pumped oil as the first oil with pressure. Thus, the first oil flows in the oil passage 22 through the line pressure regulation valve 23. The output pressure sensor 26 sequentially detects the pressure (output pressure) P1 of the first oil flowing in the oil passage 22, and outputs the detection signal to the control unit 28. The engine rotation number sensor 48 sequentially detects the engine rotation number New, and outputs the detection signal to the control unit 28. In addition, the oil temperature sensor 50 sequentially detects the oil temperature To of the oil (first oil) stored in the reservoir 18, and outputs the detection signal to the control unit 28. The vehicle speed sensor 52 sequentially detects the vehicle speed V of the vehicle 14, and outputs the detection signal to the control unit 28.

If the motor 32 is not driven, the first oil flowing in the oil passage 22 flows to the oil passage 40 through the check valve 44. Thus, the first oil is supplied to the high-pressure system 42 through the oil passages 22, 40. The line pressure sensor 46 sequentially detects the pressure of the first oil (line pressure PH) supplied to the high-pressure system 42, and outputs the detection signal to the control unit 28. Note that when the spool valve is displaced depending on the line pressure PH, the line pressure regulation valve 23 enables the oil passage 22 and the oil passage 25 to communicate with each other and supply the first oil as the third oil to the low-pressure system 24.

Next, when the supply of the control signal from the motor controller 28e of the control unit 28 to the driver 34 is started in a state that the first pump 20 is driven, the driver 34 drives the motor 32 on the basis of the control signal to rotate the second pump 30. Thus, the second pump 30 outputs as the second oil, the first oil that flows in the oil passage 22. As a result, the second oil is supplied to the high-pressure system 42 through the oil passage 40.

Then, if the flow rate of the second oil (the discharging flow rate of the second pump 30) has exceeded the flow rate of the first oil (the discharging flow rate of the first pump 20), the pressure of the oil (line pressure PH) on the oil passage 40 side becomes higher than the pressure of the oil (output pressure P1) on the oil passage 22 side in the check valve 44. Thus, the check valve 44 is closed, so that the supply of the first oil from the first pump 20 to the high-pressure system 42 through the check valve 44 is switched to the supply of the second oil from the second pump 30 to the high-pressure system 42 through the oil passage 40. As a result, the flow of the first oil to the oil passage 40 is stopped and the second pump 30 transfers the second oil with pressure to the high-pressure system 42.

The line pressure sensor 46 sequentially detects the pressure of the second oil supplied to the high-pressure system 42, as the line pressure PH and then outputs the detection signal to the control unit 28. The driver 34 sequentially outputs the rotation number Nem of the motor 32 based on the rotation number Nep of the second pump 30 to the control unit 28. The temperature sensor 38 sequentially detects the temperature Td of the driver 34, and outputs the detection signal to the control unit 28.

To the control unit 28, the detection signals from the sensors and the signals from the driver 34 are sequentially input. In the storage unit 28a, the detection results based on the detection signals sequentially input and the rotation number Nem (Nep) based on the signals from the driver 34 are stored.

Figure 3:
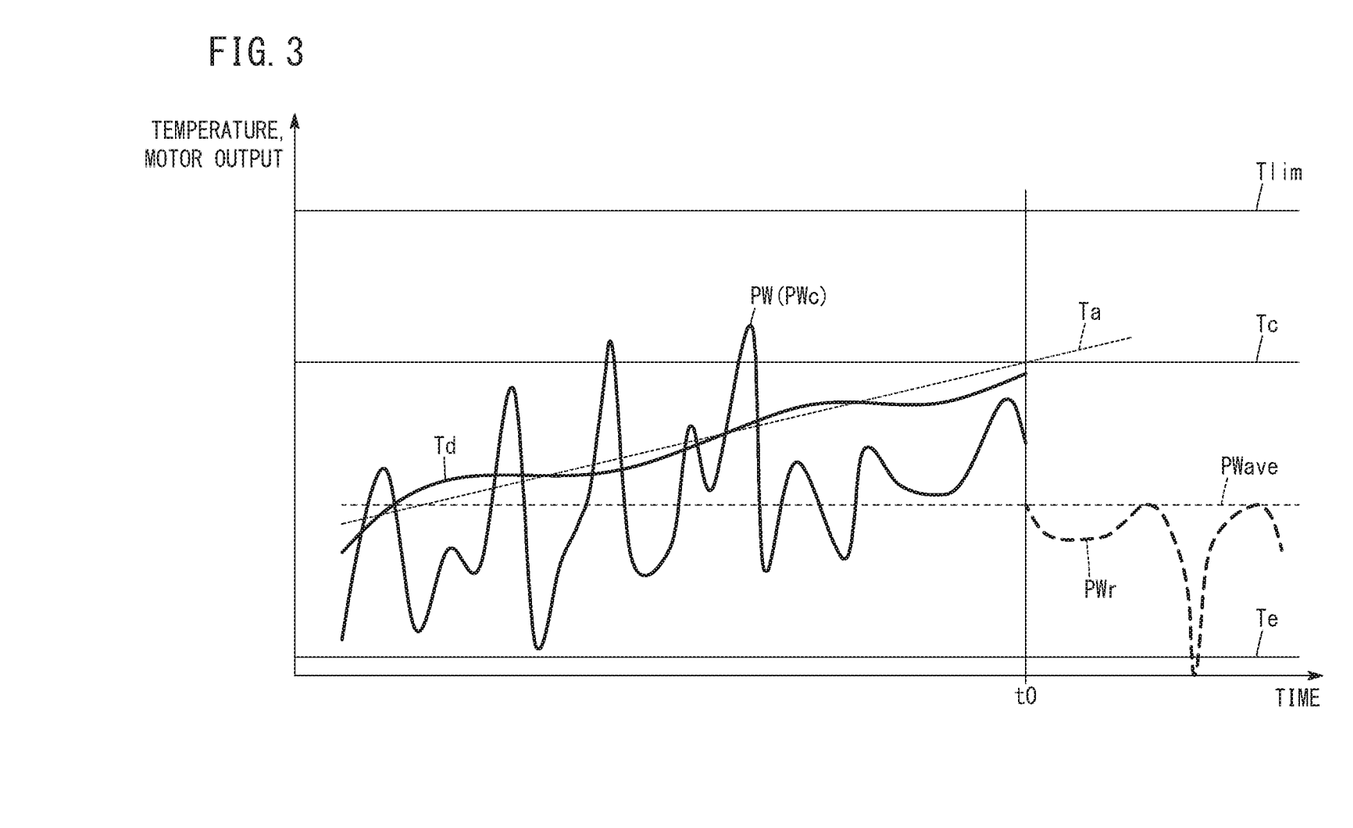
FIG. 3 is a timing chart showing how a motor output and temperatures of a driver change over time in the short-term operation.

(2.1.2 Hydraulic Control Process to Time Point t0 in FIG. 3)

Figure 2:
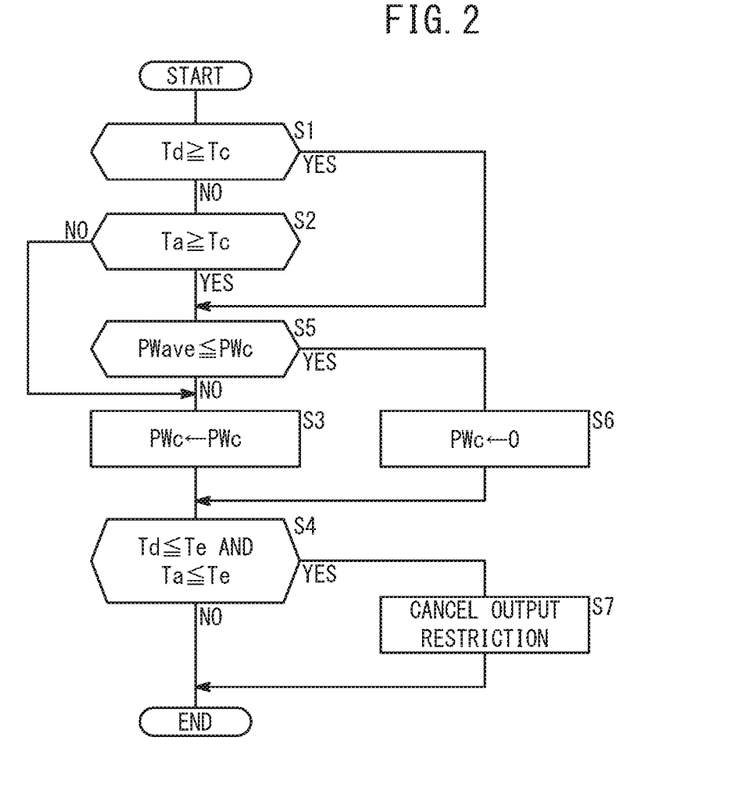
FIG. 2 is a flowchart expressing a short-term operation of the hydraulic control device in FIG. 1.

In such an operation state, the short-term hydraulic control process as illustrated in FIG. 2 and FIG. 3 is performed in the control unit 28. FIG. 2 is a flowchart expressing the short-term hydraulic control process in the hydraulic control device 10 including the control unit 28, and FIG. 3 is a timing chart showing how the temperatures Ta, Td and the motor output PW (command value PWc thereof) change over time in the short-term hydraulic control process. The flowchart in FIG. 2 is repeated at predetermined time intervals.

In this case, the restriction start temperature setting unit 28g sets in advance a predetermined temperature less than the use limit temperature Tlim as the restriction start temperature Tc, and moreover sets a predetermined temperature less than or equal to the restriction start temperature Tc as a restriction cancel temperature Te in advance. The setting of the restriction start temperature Tc will be described below.

The temperature acquisition unit 28b acquires the temperature Td from the temperature sensor 38 at predetermined time intervals, or estimates the temperature Tde of the driver 34 on the basis of the oil temperature To from the oil temperature sensor 50 and acquires the estimated temperature Tde as the temperature Td. The acquired temperature Td is stored in the storage unit 28a. The temperature acquisition unit 28b reads out from the storage unit 28a, the data of the temperature Td acquired sequentially within the last predetermined time relative to the current time (for example, within several minutes from the current time) at predetermined time intervals. From the read data of the temperature Td, the temperature acquisition unit 28b calculates the approximate line (temperature Ta) of the temperature Td.

On the other hand, the motor output calculation unit 28d calculates the motor output PW (command value PWc thereof) by multiplying the torque of the motor 32 by the rotation number Nem of the motor 32 that is estimated on the basis of the line pressure PH at predetermined time intervals. The calculated command value PWc is stored in the storage unit 28a. The motor output calculation unit 28d reads out from the storage unit 28a, the data of the command values PWc calculated within the last predetermined time relative to the current time at predetermined time intervals, and then calculates the average value PWave on the basis of the data of the read command values PWc.

FIG. 3 illustrates a case in which as the time elapses, the temperature Td of the driver 34 and the temperature Ta of the approximate line increase and the command value PWc increases or decreases around the average value PWave until a time point t0. In FIG. 3, the time to the time point t0 is about several minutes, and the temperature Ta exhibits the values of the approximate line obtained from the change in temperature Td over time for the latest several minutes from the time point t0.

In step S1 in FIG. 2, the temperature determination unit 28c determines whether the temperature Td of the driver 34 is more than or equal to the restriction start temperature Tc. In a time band until the time point t0, Td<Tc holds (step S1: NO); therefore, the temperature determination unit 28c determines whether the temperature Ta of the approximate line is more than or equal to the restriction start temperature Tc in step S2. In the time band until the time point t0, Ta<Tc holds (step S2: NO); therefore, the temperature determination unit 28c determines that the temperatures Ta, Td have not reached the restriction start temperature Tc.

In the next step S3, in response to the negative determination result in the temperature determination unit 28c, the motor controller 28e sets the motor output PW (command value PWc thereof) calculated by the motor output calculation unit 28d as the command value PWc for the motor 32.

In step S4, the temperature determination unit 28c determines whether the temperature Td and the temperature Ta of the approximate line are less than or equal to the restriction cancel temperature Te. As illustrated in FIG. 3, in the time band until t0, Td>Te and Ta>Te hold (step S4: NO). In response to the negative determination result in the temperature determination unit 28c, the motor controller 28e outputs the control signal based on the command value PWc as described above to the driver 34.

Thus, the driver 34 drives the motor 32 in accordance with the command value PWc expressed by the control signal supplied from the motor controller 28e, so as to rotate the second pump 30. As a result, the second oil is continuously supplied to the high-pressure system 42 by the second pump 30 (regular operation state).

(2.1.3 Hydraulic Control Process at Time Point t0)

Next, if the temperature Ta of the approximate line has reached the restriction start temperature Tc before the temperature Td of the driver 34 at the time point t0 in FIG. 3 (step S1: NO, step S2: YES), in step S5 in FIG. 2, the motor controller 28e determines whether the command value PWc is more than or equal to the average value PWave in response to the positive determination result (Ta≥Tc) in step S2.

In a case where PWave ≤PWc holds in step S5 (step S5: YES), the motor controller 28e determines in the next step S6 that the thermal deterioration of the electronic components of the driver 34 progresses if the motor 32 and the second pump 30 are driven in accordance with the command value PWc. Then, the motor controller 28e sets the command value PWc to zero in order to stop the motor 32.

Next, the temperature determination unit 28c determines whether Td≤Te and Ta≤Te hold in step S4. In this case, since Td>Te and Ta>Te hold (step S4: NO), the motor controller 28e outputs the control signal based on the command value PWc=0 set in step S6 to the driver 34 in response to the negative determination result in step S4.

Thus, the driver 34 stops the motor 32 in accordance with the command value PWc expressed by the control signal supplied from the motor controller 28e, so as to stop the second pump 30. As a result, the supply of the second oil to the high-pressure system 42 by the second pump 30 is stopped and the first oil is supplied from the first pump 20 to the high-pressure system 42 through the check valve 44.

(2.1.4 Hydraulic Control Process After Time Point t0)

If the temperature Ta or the temperature Td is more than or equal to the restriction start temperature Tc after the time point t0 in FIG. 3 (step S1: YES or step S2: YES), the process advances to step S5 in FIG. 2. If the command value PWc is more than or equal to the average value PWave in step S5 (step S5: YES), PWc=0 is set in step S6. On the other hand, if the command value PWc is less than the average value PWave (step S5: NO), the command value PWc is maintained. Then, if Td>Te or Ta>Te holds in the next step S4 (step S4: NO), the motor controller 28e outputs the control signal based on the command value PWc set in step S3 or step S6 to the driver 34.

That is to say, in order to decrease the temperature Td of the driver 34 and the temperature Ta of the approximate line after the time point t0, the control unit 28 performs an output restriction process to restrict the maximum value of the motor output PW (command value PWc thereof) to the average value PWave. As a result, by repeating the process in FIG. 2, the average value PWave can be decreased and the temperatures Ta, Td can be decreased gradually as the time elapses. Note that in FIG. 3, a motor output PWr expressed by a dashed line after the time point t0 shows how the command value PWc changes over time when the maximum output value is restricted to the average value PWave.

In the flowchart in FIG. 2, if the temperature Td and the temperature Ta of the approximate line become less than or equal to the restriction cancel temperature Te (step S4: YES), the motor controller 28e cancels the output restriction process for the motor 32 in step S7. Thus, in the next cycle of the process in FIG. 2, the motor 32 and the second pump 30 can be controlled on the basis of the command value PWc calculated by the motor output calculation unit 28d.

<2.2 Long-Term Hydraulic Control Process>

The long-term hydraulic control process is a control process by the hydraulic control device 10 that is performed every predetermined period in a long-term period until the target lifetime (for example, if the target lifetime is a period of ten and several years or a travel distance of one hundred and several tens of thousands of kilometers, every several months or every several thousands of kilometers).

Figure 4:
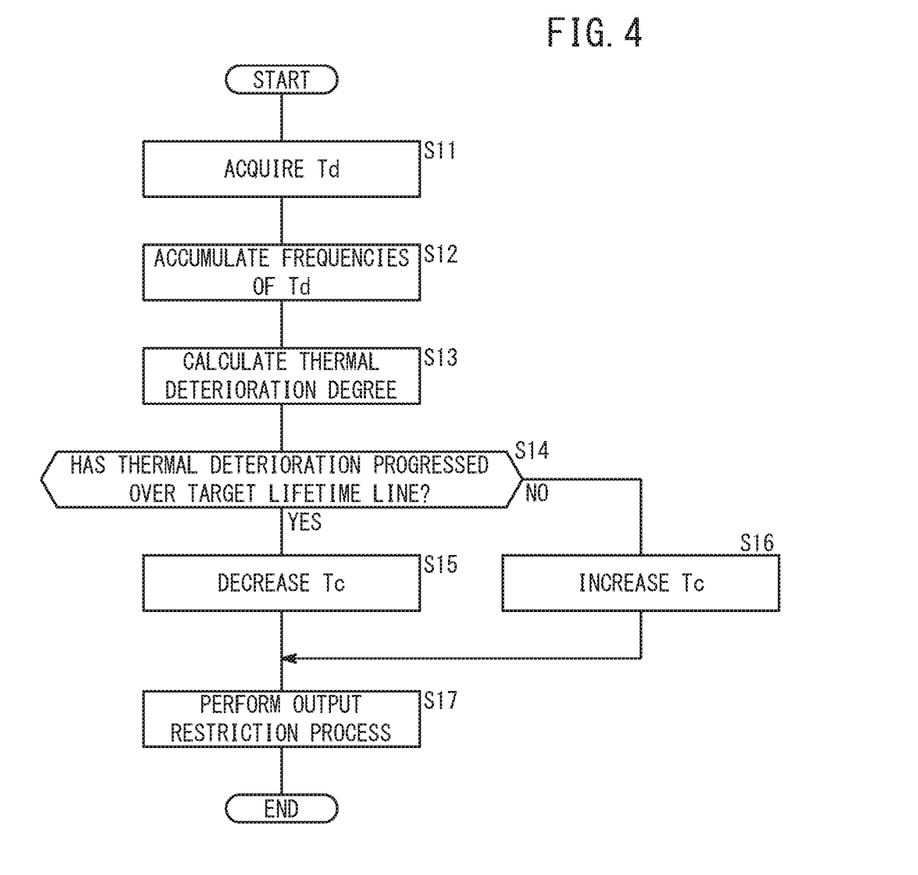
FIG. 4 is a flowchart expressing a long-term operation of the hydraulic control device in FIG. 1.
Figure 5:
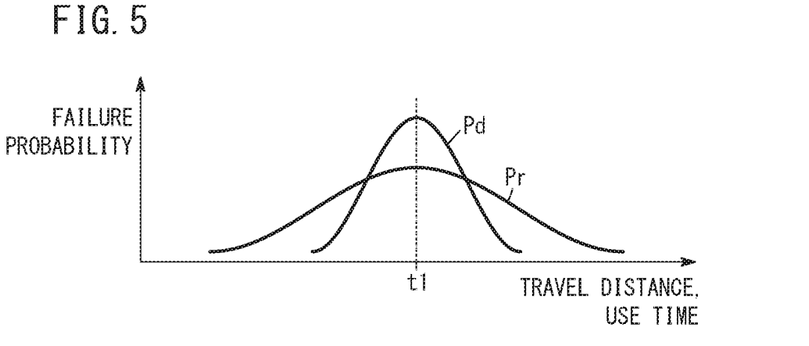
FIG. 5 is a diagram showing a failure probability of electronic components illustrated in FIG. 1.

FIG. 4 is a flowchart expressing the long-term hydraulic control process. FIG. 5 is an explanatory view showing a failure probability distribution of the electronic components of the driver 34 relative to the travel distance of the vehicle 14 or the use time of the driver 34. Note that the travel distance is obtained by multiplying the time by the vehicle speed V detected by the vehicle speed sensor 52.

Here, a failure probability distribution Pd is a distribution of the failure probabilities of the electronic components alone, and a failure probability distribution Pr is a distribution of the failure probabilities of the electronic components when the driver 34 including the electronic components is operated actually. In this case, the failure probability is the maximum at the time point t1 (the distance in accordance with the time point t1) in either of the failure probability distributions Pd, Pr. However, the failure probability is relatively higher in the failure probability distribution Pr than in the failure probability distribution Pd even if the travel distance or the use time is short. Therefore, in the failure probability distribution Pr, the actual lifetime of the electronic components may be shorter than the target lifetime. As a result, a devise is necessary to make the failure probability distribution Pr as close to the failure probability distribution Pd as possible.

In view of this, in the hydraulic control device 10, the process in the flowchart of FIG. 4 is performed every predetermined period or every predetermined travel distance, so that the actual lifetime of the driver 34 including the electronic components is extended to the target lifetime and the failure probability distribution Pr becomes close to the failure probability distribution Pd.

Figure 6:
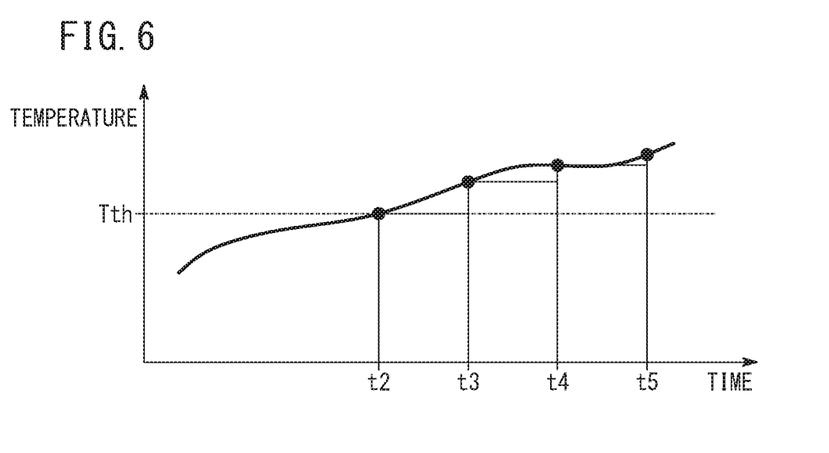
FIG. 6 is an explanatory diagram showing a counting process of the temperature of the driver.

Specifically, in step S11 in FIG. 4, the temperature acquisition unit 28*b* reads out the data of the temperature Td of the driver 34 stored in the storage unit 28*a*. FIG. 6 shows in time series, a part of each temperature Td read out from the storage unit 28*a* (temperature Td at each of the time points t2 to t5). In the next step S12, the thermal deterioration degree calculation unit 28*f* creates a cumulative frequency (histogram) for each predetermined temperature shown in FIG. 7 in regard to the data of each temperature Td that is read out.

Figure 7:
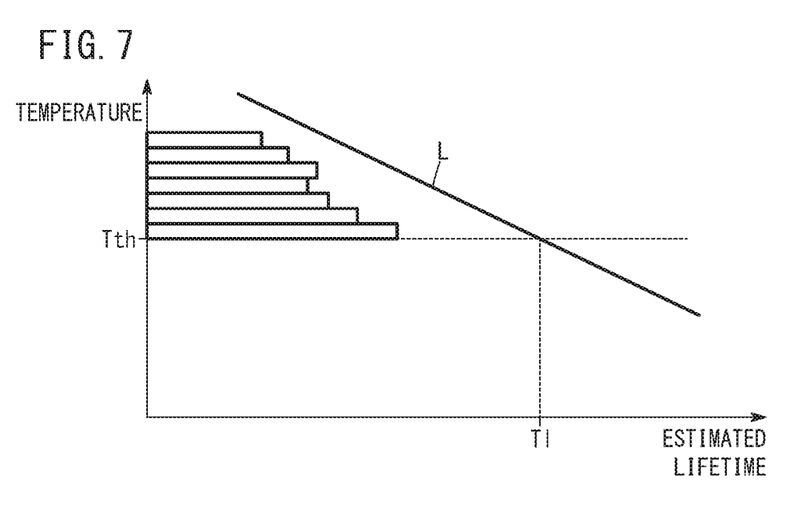
FIG. 7 is an explanatory diagram showing a cumulative frequency of the temperature of the driver.

In FIG. 7, the horizontal axis expresses the estimated lifetime and the vertical axis represents the temperature Td of the driver 34 (electronic components thereof). The thermal deterioration degree calculation unit 28*f* extracts the temperature data of more than or equal to a threshold temperature Tth among the data of the temperatures Td shown in FIG. 6, and assigns (counts) the temperature Td expressed by the extracted temperature data to the corresponding temperature Td in FIG. 7. Thus, in FIG. 7, the bars extending along the horizontal axis express the cumulative frequencies at certain temperatures Td. In FIG. 7, the line that reduces as the estimated lifetime extends expresses a thermic lifetime line L. Therefore, if the cumulative frequency at an arbitrary temperature Td exceeds the thermic lifetime line L, it is determined that the any of electronic components has reached a prescribed lifetime T1 (target lifetime) based on the threshold temperature Tth.

In the next step S13, the thermal deterioration degree calculation unit 28*f* sums (totals) the cumulative frequencies at the temperatures Td in FIG. 7, so as to calculate the thermal deterioration degree as the integrated value of the cumulative frequencies.

Figure 8:
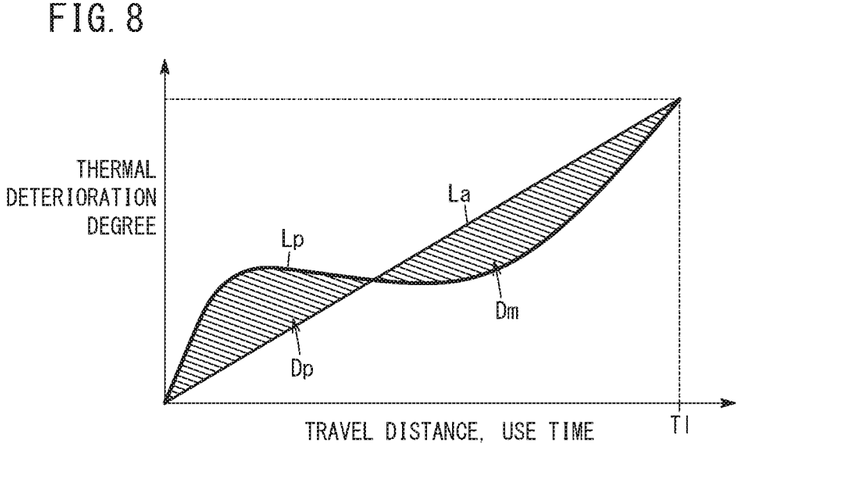
FIG. 8 is an explanatory diagram showing a relation between a thermal deterioration degree and a target lifetime consumption line.

In the map in FIG. 8 that is created using the prescribed lifetime T1, the thermal deterioration degree calculation unit 28*f* determines in the next step S14 whether the thermal deterioration degree has progressed over a target lifetime consumption line La. Note that the target lifetime consumption line La expresses an ideal change over time of the thermal deterioration degree until any of the electronic components reaches the prescribed lifetime T1. In addition, a curve line Lp in FIG. 8 expresses the actual change in thermal deterioration degree of the driver 34.

Specifically, the thermal deterioration degree calculation unit 28*f* plots the thermal deterioration degree based on the travel distance of the vehicle 14 or the use time of the driver 34 in the map expressing the travel distance and the thermal deterioration degree in FIG. 8. Thus, the deviation between the plotted thermal deterioration degree and the target lifetime consumption line La (deviation=thermal deterioration degree−target lifetime consumption line La) is obtained.

In this case, if the thermal deterioration degree is more than the target lifetime consumption line La (step S14: YES, for example, when the thermal deterioration degree is in a positive deviation range Dp), the thermal deterioration degree calculation unit 28*f* determines that the thermal deterioration degree of the electronic components has progressed over the target lifetime consumption line La. Then, in the next step S15, the restriction start temperature setting unit 28*g* decreases the restriction start temperature Tc that is currently set, on the basis of the positive determination result in step S14.

On the other hand, if the thermal deterioration degree is less than the target lifetime consumption line La (step S14: NO, for example, when the thermal deterioration degree is in a negative deviation range Dm), the thermal deterioration degree calculation unit 28*f* determines that the thermal deterioration degree of the electronic components has not progressed over the target lifetime consumption line La. In the next step S16, the restriction start temperature setting unit 28*g* increases the restriction start temperature Tc that is currently set, on the basis of the negative determination result in step S14.

Thus, in the next step S17, the temperature determination unit 28*c* may perform a determination process for the temperature Td of the driver 34 using the restriction start temperature Tc that is set newly in the restriction start temperature setting unit 28*g*, and in response to this determination result, the motor controller 28*e* may perform a process of setting the command value PWc or the like. In step S17, the process in FIG. 2 may be performed.

<2.3 Switch of Control in Accordance with Discharging Capability of Second Pump 30>

Figure 9A:
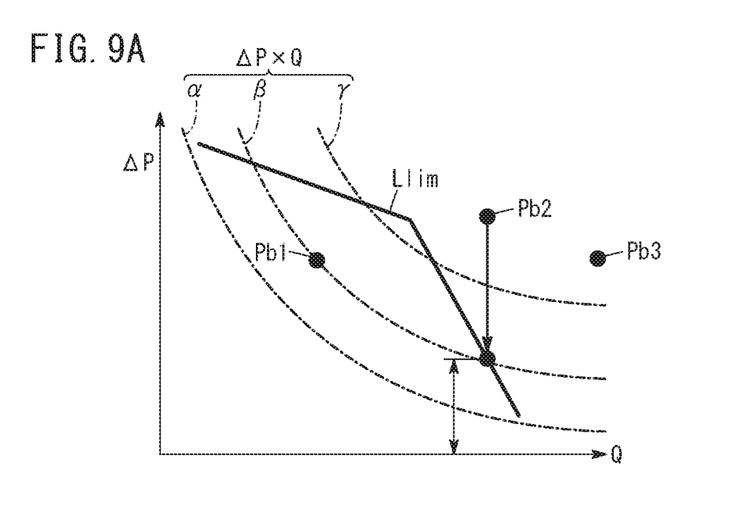
FIG. 9A and FIG. 9B are explanatory diagrams each showing a relation between operation points of a second pump and a limit line.
Figure 9B:
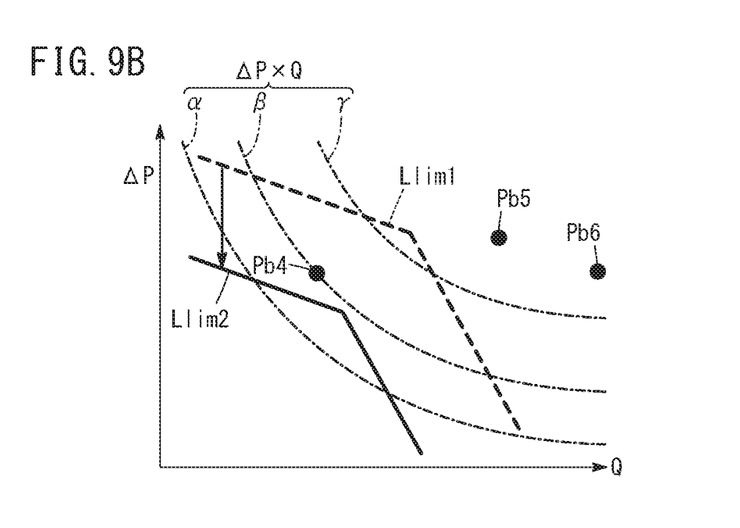

As described above, the motor controller 28*e* can control the motor 32 through the driver 34; thus, the motor controller 28*e* can perform a control process as illustrated in FIG. 9A and FIG. 9B. FIG. 9A and FIG. 9B show a relation between the differential pressure ΔP and the necessary flow rate Q of the oil (second oil) supplied to the high-pressure system 42. In FIG. 9A, Llim represents a limit line of the discharging capability of the second pump 30. In FIG. 9A and FIG. 9B, dash-dot lines express the lines expressing the equivalent horsepower α to γ (=ΔP×Q) that represent the minimum necessary horsepower to maintain the current driving state on the basis of the driving state of the vehicle 14, that is, the engine output necessary for the vehicle 14 to travel in a rated state in the current conditions.

In FIG. 9A, Pb1 to Pb3 express the operation points of the second pump 30. The operation point Pb1 is inside the limitation line Llim (differential pressure ΔP and necessary flow rate Q less than the limit line Llim); therefore, the second pump 30 can be operated at this operation point Pb1. Accordingly, the motor controller 28e sets the command value PWc based on the operation point Pb1 and supplies the control signal expressing the set command value PWc to the driver 34; thus, the motor 32 is driven to rotate the second pump 30.

The operation point Pb2 is outside the limit line Llim. Therefore, the motor controller 28e decreases the differential pressure ΔP to shift the operation point Pb2 to the limit line Llim, and supplies the control signal of the command value PWc based on the operation point Pb2 after the shift, to the driver 34. Thus, on the basis of the command value PWc, the driver 34 drives the motor 32 in a state that the output is restricted, and thus, the second pump 30 is rotated. Accordingly, the second pump 30 outputs the second oil whose pressure is restricted to be a relatively low pressure.

The operation point Pb3 is outside the limit line Llim; however, even if the differential pressure ΔP is decreased, the operation point Pb3 cannot be shifted to the limit line Llim. In this case, the motor controller 28e determines that the control (request output) cannot be performed in consideration of the discharging capability of the second pump 30, and the control signal based on PWc=0 is supplied to the driver 34. Thus, the driver 34 stops the motor 32 to stop the second pump 30. As a result, the supply of the second oil from the second pump 30 to the high-pressure system 42 is switched to the supply from the first pump 20 to the high-pressure system 42 through the check valve 44.

FIG. 9B shows a case in which the output of the motor 32 and the second pump 30 is restricted by the hydraulic control process in FIG. 2. In this case, the limit line shifts from Llim1 to Llim2. As a result, since all of the operation points Pb4 to Pb6 exceed the limit line Llim2, the control (request output) cannot be performed in consideration of the discharging capability of the second pump 30. Therefore, the motor controller 28e supplies the control signal based on PWc=0 to the driver 34 and the driver 34 stops the motor 32 to stop the second pump 30. As a result, the supply of the second oil from the second pump 30 to the high-pressure system 42 is switched to the supply from the first pump 20 to the high-pressure system 42 through the check valve 44.

[3. Effect of the Present Embodiment]

As described above, in the hydraulic control device 10 according to the present embodiment, the restriction start temperature Tc is set in accordance with the thermal deterioration degree, and the motor output PW (command value PWc thereof) is restricted (controlled) in the temperature range of less than or equal to the restriction start temperature Tc that is set. Thus, the driver 34 can be used properly until the target lifetime in various usages and environment conditions. As a result, in the short-term use state, the variation in actual lifetime due to the difference in usage and environment condition can be suppressed, and the probability that the driver 34 reaches the thermic lifetime before the target lifetime (failure probability of the driver 34) can be reduced.

If one of the temperature Td and the temperature Ta of the approximate line has reached the restriction start temperature Tc, the restriction of the motor output PW (command value PWc thereof) is started quickly; thus, the probability that the driver 34 fails before the target lifetime can be reduced efficiently.

In addition, the average value PWave in the predetermined time where the temperatures Td to be the base of the temperature Ta of the approximate line are sequentially acquired is set as the maximum output value after the motor output PW (command value PWc thereof) is restricted. Thus, after the restriction is started, the temperatures Ta, Td can be reduced from the restriction start temperature Tc.

In addition, in a case where the request output to the motor 32 (command value PWc) is more than or equal to the maximum output value (average value PWave) while the motor output PW is restricted, the motor 32 is stopped by setting PWc=0. Thus, the fuel efficiency of the vehicle 14 can be maintained, and the reduction of the temperature Ta, Td from the restriction start temperature Tc and the use of the driver 34 until the target lifetime can be achieved.

Moreover, if the temperatures Ta, Td are decreased to be less than or equal to the restriction cancel temperature Te set to be less than or equal to the restriction start temperature Tc after the motor output PW is restricted, the restriction of the motor output PW is canceled. Therefore, the motor 32 can be returned quickly from the output restricted state to the regular operation state.

Furthermore, if the thermal deterioration degree has progressed in the long-term use state, the restriction start temperature Tc is decreased so that the motor output PW can be restricted easily. On the other hand, if the thermal deterioration degree has not progressed, the restriction start temperature Tc is increased so that the motor 32 can continue its regular operation state. As a result, the driver 34 can be used until the target lifetime while the exposure of the driver 34 to high temperature is prevented.

The present invention is not limited to the above embodiment, and various structures can be employed on the basis of the description of this specification.

What is claimed is:

1. A hydraulic control device configured to supply oil to a hydraulic operation unit of a transmission from a pump driven by a motor, comprising:
   a motor driving unit configured to drive the pump by driving the motor;
   a temperature acquisition unit configured to acquire a temperature of the motor driving unit;
   a thermal deterioration degree calculation unit configured to calculate a thermal deterioration degree of the motor driving unit on a basis of the temperature;
   a restriction start temperature setting unit configured to set a restriction start temperature for restricting an output of the motor on a basis of the thermal deterioration degree;
   a temperature determination unit configured to determine whether the temperature has reached the restriction start temperature; and
   a motor controller configured to restrict the output of the motor through the motor driving unit if the temperature determination unit determines that the temperature has reached the restriction start temperature,
   wherein the temperature acquisition unit is configured to sequentially acquire the temperature and create an approximate line of the temperature until a current time point by using the temperature that is sequentially acquired; the temperature determination unit is configured to determine whether the temperature at the current time point acquired by the temperature acquisition unit or an approximate value of the temperature at the current time point at the approximate line has reached the restriction start temperature; and if the temperature determination unit determines that the temperature or the approximate value has reached the restriction start temperature, the motor controller is configured to restrict the output of the motor.

2. The hydraulic control device according to claim 1, wherein the motor controller is configured to set an average value of the output of the motor within a predetermined time where the temperature is sequentially acquired for creating the approximate line, as a maximum output value of the motor after an output restriction of the motor.

3. The hydraulic control device according to claim 2, wherein if a request output to the motor is more than or equal to the maximum output value after the output restriction of the motor, the motor controller is configured to stop the output of the motor.

4. The hydraulic control device according to claim 1, wherein:
the temperature determination unit is configured to determine whether the temperature and the approximate value decrease to be less than or equal to a restriction cancel temperature that is set to be less than or equal to the restriction start temperature after an output restriction of the motor; and
if the temperature determination unit determines that the temperature and the approximate value have decreased to be less than or equal to the restriction cancel temperature, the motor controller is configured to cancel the output restriction of the motor.

5. A hydraulic control device configured to supply oil to a hydraulic operation unit of a transmission from a pump driven by a motor, comprising:
a motor driving unit configured to drive the pump by driving the motor;
a temperature acquisition unit configured to acquire a temperature of the motor driving unit;
a thermal deterioration degree calculation unit configured to calculate a thermal deterioration degree of the motor driving unit on a basis of the temperature;
a restriction start temperature setting unit configured to set a restriction start temperature for restricting an output of the motor on a basis of the thermal deterioration degree;
a temperature determination unit configured to determine whether the temperature has reached the restriction start temperature; and
a motor controller configured to restrict the output of the motor through the motor driving unit if the temperature determination unit determines that the temperature has reached the restriction start temperature,
wherein the thermal deterioration degree calculation unit is configured to calculate the thermal deterioration degree on the basis of the temperature that is sequentially acquired in the temperature acquisition unit; and
if the calculated thermal deterioration degree is more than an ideal change over time of the thermal deterioration degree relative to a use time of the motor driving unit or a travel distance of a vehicle including the transmission, the restriction start temperature setting unit is configured to decrease the restriction start temperature that is currently set, and if the calculated thermal deterioration degree is less than the ideal change over time, the restriction start temperature setting unit is configured to increase the restriction start temperature that is currently set.

* * * * *